Figure 1:
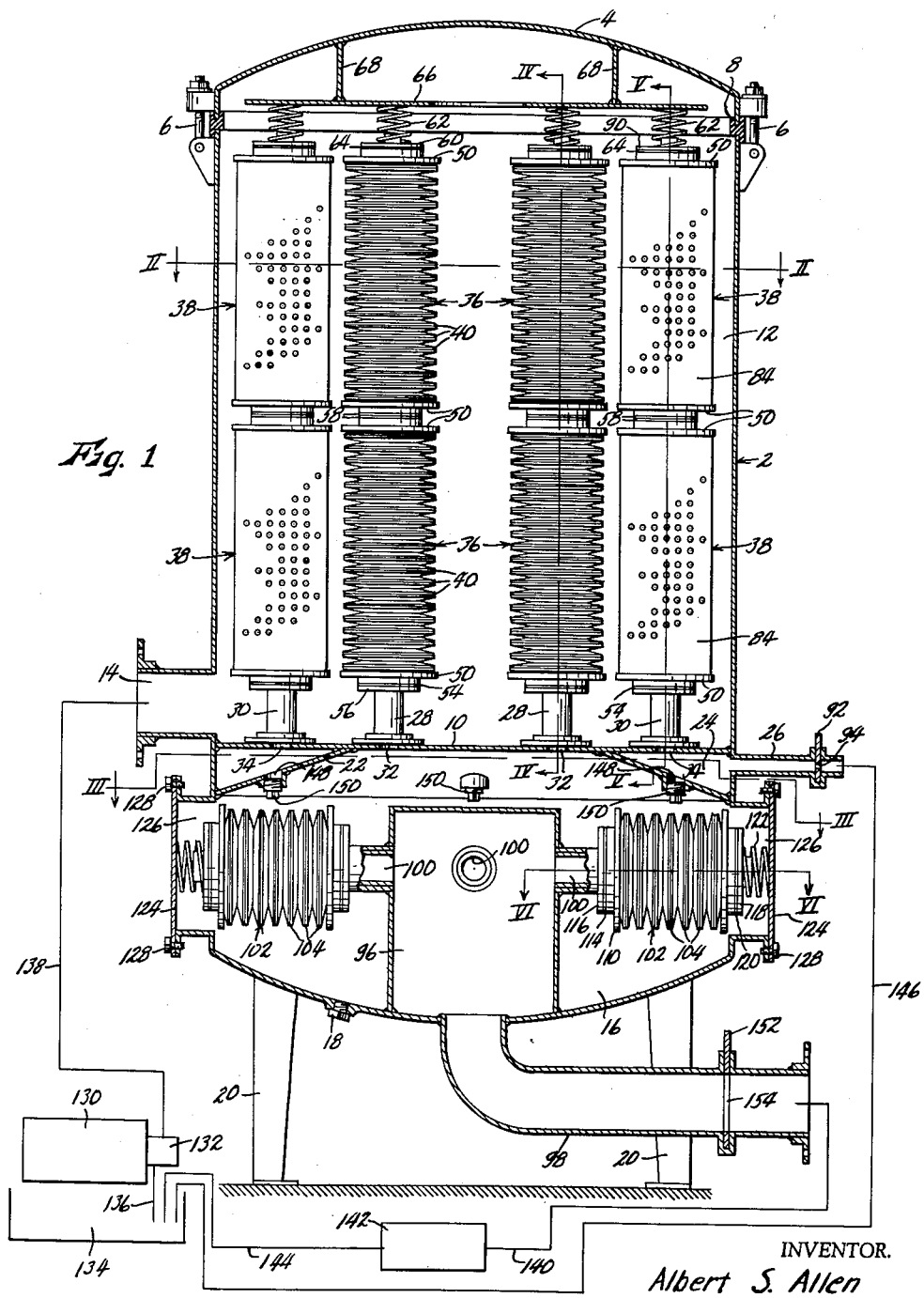

Feb. 20, 1962  A. S. ALLEN  3,021,954
COMBINATION FULL-FLOW AND BY-PASS FILTER
Filed Nov. 24, 1958  3 Sheets-Sheet 1

INVENTOR.
Albert S. Allen
BY John A. Hamilton
Attorney.

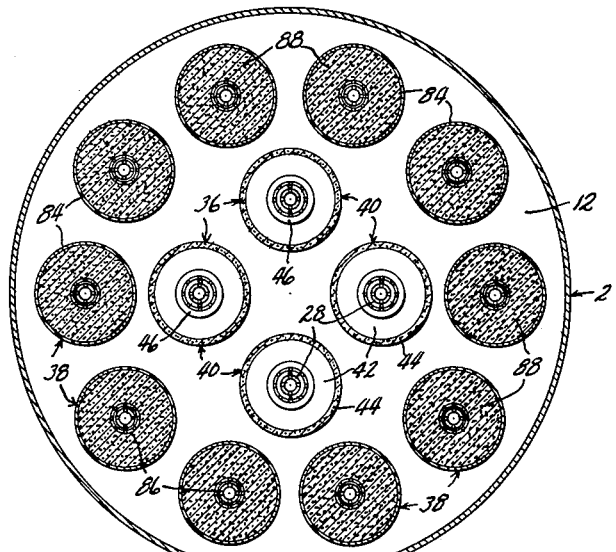
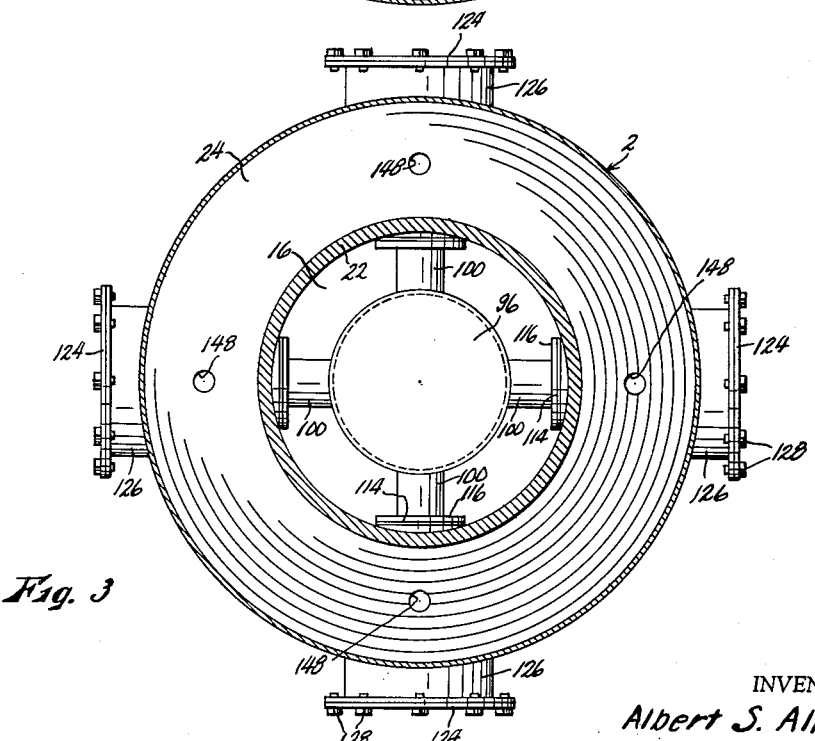

Feb. 20, 1962 A. S. ALLEN 3,021,954
COMBINATION FULL-FLOW AND BY-PASS FILTER
Filed Nov. 24, 1958 3 Sheets-Sheet 3

INVENTOR.
Albert S. Allen
BY
John A. Hamilton
Attorney.

3,021,954
COMBINATION FULL-FLOW AND BY-PASS FILTER

Albert S. Allen, Springfield, Mo., assignor to Hoffman-Allen Corporation, Springfield, Mo., a corporation of Missouri
Filed Nov. 24, 1958, Ser. No. 775,741
3 Claims. (Cl. 210—132)

This invention relates to new and useful improvements in filters, and has particular reference to a combination of full-flow and by-pass filters. It represents an improvement over the filter shown in my copending application Serial No. 747,433, filed July 9, 1958 now Patent No. 2,966,269 dated December 27, 1960, and entitled "Combination Full-Flow and By-Pass Filter with Strainer."

In the filtration of oil, as for example in the lubrication systems of internal combustion engines in large installations, it has been found advantageous to employ a combination full-flow and by-pass filter system. Such a system incorporates "full-flow" filtering cartridges capable of filtering the entire flow of oil. These cartridges are usually of the "surface" type wherein the oil flows through a single layer of filter paper or the like. They have a high flow rate, and may be of reasonably compact size and operate with the expenditure of relatively low pump power, but are not sufficiently efficient to remove all foreign matter from the oil. Continued operation will permit a gradual increase in the amount of foreign matter in the oil, particularly oxides and very fine sludges. To eliminate this gradual build-up of impurities, the combination system by-passes a portion (perhaps 5%–10%) of the oil from the full-flow cartridges through by-pass filter cartridges. The by-pass cartridges are usually of the "depth" or "absorption" type wherein the oil passes through a thick bed of filtering material such as fuller's earth, cellulose, solka floc or similar material. These cartridges are capable of removing substantially all filterable impurities from the oil, but are intrinsically of low capacity since they require much greater power to pump oil therethrough than do the full-flow units, and since efficient operation requires retention of the oil in the cartridge for a relatively long period of time to allow absorption of impurities to take place. In much larger installations the filtering of all the oil through this type of filtering cartrdge would be prohibitive in expense and in requirements of size, space and power.

The combination system wherein perhaps 5%–10% of the oil is processed through depth type filtering units in each cycle of the oil has been found very effective in preventing build-up of impurities in the oil, and to produce an extremely efficient overall filtration, but nevertheless as heretofore practiced has been subject to certain disadvantages. The full-flow and by-pass filtering units have ordinarily been supplied in separate housings or casings, which of course makes the system expensive, and requires considerable space and extensive piping. The depth-type by-pass units usually cannot pass cold oil, and therefore have required steam, electric or other heating means to start and maintain the flow of oil therethrough. Each filtering unit has required a separate relief valve for safety, to by-pass oil around the unit whenever said unit becomes clogged or inoperative.

My above identified prior application contemplated the overcoming of these difficulties generally by placing both the full-flow and by-pass filter units in one housing with a single inlet but with separate outlets for the two types of filter units. In this manner the oil passes only through the full-flow units until the engine is warmed up, but at the same time circulates about the by-pass units to heat them to efficient operating temperature. Operating with full-flow units only is not detrimental for short periods of operation, and no separate auxiliary heaters for the by-pass units are required. Only the full-flow units need be provided with safety relief valves, since they will permit flow of all the oil even if both types of filter units are clogged or inoperative. A strainer was also connected in series in the full-flow outlet, so as to provide at least coarse filtration of the oil even if the full-flow units should fail due to rupture, and even if under extreme conditions the oil should be too cold to pass through the full-flow units and hence flows through the relief valves. Means also were provided for adjustably restricting flow through the by-pass units, in order to permit proper proportioning of the total flow between the full-flow and by-pass units, and to insure adequate retention time of the oil in the by-pass units for efficient absorption of impurities therefrom.

The present invention has as its principal object the provision of a combination full-flow and by-pass filter as above described with additional means whereby the same filter may be adapted for use either with all full-flow units or all by-pass units, as desired, as well as the combination operation previously discussed, the device also being adapted to use or not to use the strainer in any of its three types of operation just mentioned. This greatly increases the flexibility of use of the device, and hence its commercial value and utility. For example, in some installations full-flow filtration may be adequate where highly efficient filtration is unnecessary. In other installations requiring extremely efficient filtration, all by-pass or absorption type filtration may be necessary. Furthermore, in certain large installations requiring a plurality of my devices for the required capacity, it may be desirable in the interests of economy and simplicity of piping that one or more of my devices perform all of the full-flow filtration, while other devices perform all of the by-pass filtration. My device as presently improved is adapted to fulfill all of these needs.

This object is accomplished in general by making the full-flow and by-pass filter units or cartridges freely interchangeable in the housing, so that when desired the housing may be furnished entirely with one type of filter cartridge or the other, and by providing one or more by-pass passageways interconnecting chambers within the housing to which normally the oil is delivered respectively from the usual by-pass and full-flow sections of the filter. When the device is to be used as a combination full-flow and by-pass filter as described in my prior application, these by-pass passageways are sealed and inoperative. When the device is to be used either for all full-flow or all depth type filter operation, the casing is fitted entirely with filter cartridges of one type or the other, the by-pass passageways are opened and the normal by-pass outlet of the casing is sealed. All of the oil then leaves the casing through the usual full-flow outlet of the casing, and is all subjected to the same type of filtration.

All of the oil is also so directed as to pass through the strainer units, and the strainer units are so mounted as to be removable when so desired, so as to provide strainer protection or not, as may be desired.

With these objects in view, as well as other objects which will appear in the course of the specification, reference will be had to the drawing, wherein:

FIG. 1 is a vertical, central sectional view through a combination full-flow and by-pass filter and strainer device embodying the present invention, shown with its parts arranged for combined full-flow and by-pass operation, with parts left in elevation, and with a lubrication system incorporating said device shown schematically, FIGS. 2 and 3 are sectional views taken respectively on lines II—II and III—III of FIG. 1, and FIGS. 4 and 5 and 6 are enlarged, foreshortened, fragmentary sectional views taken respectively on lines IV—IV, V—V and VI—VI of FIG. 1.

Like reference numerals apply to similar parts throughout the several views, and the numeral 2 applies generally to a casing or housing having the form of a cylindrical tank capable of holding the pressure of the oil system. It is provided at its upper end with a cover 4 retained thereon by swing bolts 6 and sealed by gasket 8. The casing is divided by a horizontal partition wall 10 into an upper or filter chamber 12 having an inlet 14, and a lower or strainer chamber 16 having a drainplug 18. The casing is supported by legs 20. A conically shaped wall 22 is disposed in the upper portion of chamber 16, being secured at its upper edge to wall 10 and at its lower edge to the cylindrical wall of housing 2, whereby to form an annular chamber 24 having an outlet pipe 26.

Figure 4:
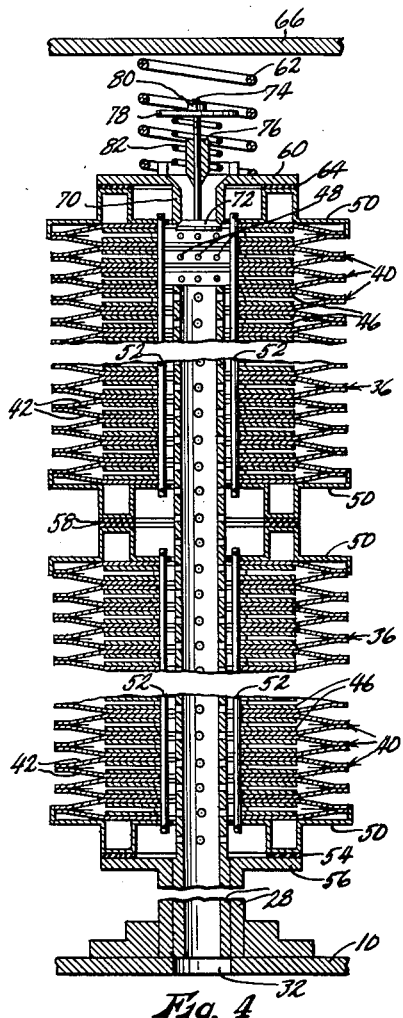

Rigidly attached to and extending upwardly from wall 10 are a plurality of perforated standpipes 28 and 30. Standpipes 28 are disposed centrally of wall 10, and communicate directly with strainer chamber 16 through holes 32 formed in said wall. Standpipes 30 are disposed around the edge portions of wall 10, and communicate with chamber 24 through holes 34 formed in said wall. In combination full-flow and by-pass operation, each standpipe 28 carries a pair of full-flow filter cartridges 36. As best shown in FIGS. 2 and 4, each full-flow cartridge 36 may constitute a stack of wafers 40 each formed of a pair of annular discs 42 of filter paper or the like. Said discs are secured together around their outer peripheral edges as by adhesive 44, and are spaced apart at their inner peripheral edges by annular spacers 46 having apertures 48 therein opening into the central aperture of the wafer. The wafers are stacked together in generally cylindrical form and held together between end plates 50 by tie rods 52. The cartridges are placed over a standpipe 28. The lower end of the lower cartridge is sealed by a gasket 54 against a flange 56 of the standpipe. The contiguous ends of the two cartridges are sealed by gaskets 58, and the top end of the upper cartridge is sealed by a cap member 60 urged thereagainst by a spring 62, a gasket 64 being disposed between said cap and said cartridge. The upper end of said spring bears against the lower surface of an annular plate 66 fixed in cover 4 by means of struts 68. Thus when the cover is removed, the filter cartridges may be removed and replaced whenever necessary.

The above recited construction of the full-flow cartridge is exemplary only. It will be understood that any cartridge having a high-capacity and low pressure drop may be utilized. They must be capable of processing the full flow of oil to be filtered, at acceptable pressure and power requirements. This type of filter, however, cannot prevent the gradual accumulation of oxides, very fine sludges and other fine impurities in the oil. Filters such as by-pass cartridges 38 are available which are capable of removing even these very fine impurities, but a device embodying only cartridges of this type would in many installations be prohibitive in size, cost, and power requirements. In the full-flow cartridges as described, the oil in filter chamber 12 passes inwardly through single layers of filter paper 42 into the interiors of wafers 40, and thence through apertures 48 of spacers 46, into standpipes 28 through the perforations thereof, and downwardly through said standpipes into strainer chamber 16.

Each of cap members 60 is provided with a pressure relief valve as best shown in FIG. 4. Said cap member has a tubular hub 70 the lower end of which forms a valve seat. Cooperating with said seat is a valve disc 72 mounted on a stem 74 which extends upwardly from said disc and is disposed slidably in a sleeve 76 integral with the cap. A washer 78 is secured adjustably on the upper end of said stem by a nut 80, and a spring 82 is compressed between said washer and the cap, whereby disc 72 is urged upwardly against the valve seat. Whenever the pressure in filter chamber 12 exceeds a level which is predetermined by turning nut 80 to vary the tension of spring 82, disc 72 will be forced downwardly from its seat and oil will pass directly from chamber 12 into standpipes 28 without passing through filter wafers 40. The circumstances of this occurrence will be set forth fully below.

Figure 5:
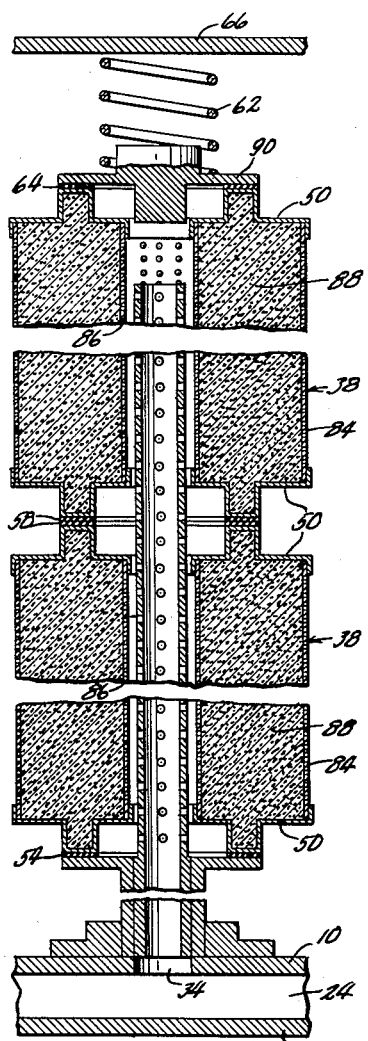

As best shown in FIGS. 2 and 5, each of by-pass filter cartridges 38, by way of example only, may each comprise an outer cylinder 84 and an inner cylinder 86, both perforated, said cylinders being disposed concentrically to form an annular chamber containing a filter medium 88 which may be fuller's earth, waste, cellulose or the like. The ends of each cartridge are closed by end plates 50 corresponding to those of the full-flow cartridges. The by-pass cartridges are placed over each standpipe 30, and are sealed by gaskets 54, 58 and 64, and by cap 90 and spring 62, in the same manner as the full-flow cartridges. However, the cap member 90 associated with each by-pass standpipe, which corresponds to cap 60 of the full-flow cartridges, is solid and imperforate, not being supplied with a pressure relief valve as is each cap 60.

Here again the specific structure of the by-pass cartridges shown is exemplary only. The essential property thereof is that they be capable of removing the very fine impurities previously mentioned. It will be obvious, however, that in this "depth-type" or "absorption" filter, the oil must pass through a relatively thick bed of the filtering medium, and must be retained therein for a relatively long period of time to permit absorption of impurities therefrom. The oil passes inwardly through the cartridges, then downwardly through standpipes 30 into chamber 24, and thence through outlet pipe 26. Said outlet pipe is equipped with an orifice plate 92 having an orifice 94 formed therethrough for restricting the flow of oil, for a purpose to be discussed.

Figure 6:
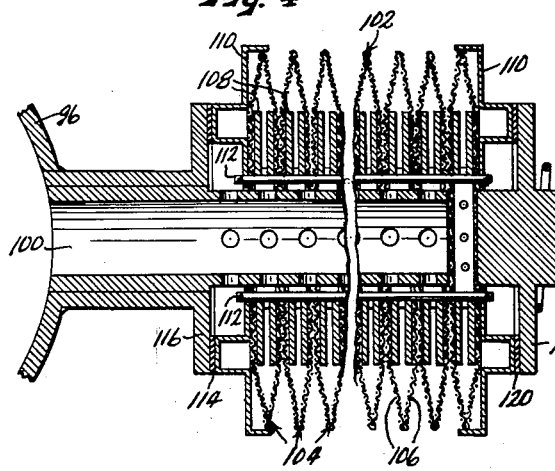

The strainer system carried in strainer chamber 16 is best shown in FIGS. 1, 3 and 6. Disposed centrally in chamber 16 is a smaller cylindrical outlet chamber 96 into which the main outlet pipe 98 is interconnected. Extending horizontally outwardly from chamber 96, within chamber 16, are a plurality of perforated standpipes 100. Mounted on each of said standpipes is a strainer cartridge 102 similar in most respects to the full-flow cartridges 36. It comprises a series of wafers 104 each formed of a pair of annular discs 106 (FIG. 6), which are, however, a fine mesh screen rather than filter paper as in cartridges 36. Discs 106 of each wafer are bound together at their outer peripheral edges, and have their inner peripheral edges held apart by perforated annular spacers 108. The wafers are held together under pressure between end plates 110 by tie rods 112. The cartridge thus formed is applied over standpipe 100, the inner end of said cartridge being sealed by gasket 114 against a flange 116 of said standpipe, and the outer end thereof being sealed by a cap 118 and gasket 120 held thereagainst by a spring 122. The opposite end of said spring bears against a closure plate 124 which is provided for an opening 126 in the outer wall of chamber 16, and which is held in place by screws 128. When said closure plates are removed, the strainer cartridges may be removed and replaced through openings 126. The strainer cartridges may be of other constructions than that specified, so long as they are capable of performing a rough or coarse filtration of the oil. They are intended in the present structure only as stand-by units to afford a degree of protection in the event of failure of the full-flow and by-pass cartridges.

A system utilizing my invention is shown diagrammatically in FIG. 1. An engine the lubricating oil of which is to be filtered is indicated at 130. Said engine drives an oil pump 132 which elevates oil from a sump 134 through a conduit 136, and delivers it under pressure through a conduit 138 to the inlet 14 of casing 2. The full-flow outlet 98 of the filter device is connected by conduit 140 to the lubricating system 142 of engine 130, from whence it flows back to sump 134 through conduit 144. The by-pass outlet 26 of the filter device is connected by conduit 146 directly to sump 134, which is of course customarily at atmospheric pressure.

The operation of the system in combination full-flow and by-pass installations, is substantially as follows. Oil entering filter chamber 12 through inlet 14 under pressure will of course tend to flow through and be filtered, by both the full-flow cartridges 36 and the by-pass cartridges 38, the proportion flowing through each type of cartridge depending on the relative resistance to flow of said cartridges. It is well known that by-pass cartridges of the type shown will pass oil only very slowly, if at all, when the oil is cold, and it will therefore be apparent that if engine 130 has just been started and the oil is cold, most of the oil must flow through full-flow cartridges 36, and thence through standpipes 28, chamber 16, strainer cartridges 102, standpipes 100, chamber 96, outlet 98 and conduit 140 to the lubricating system 142 of the engine, and thence back to sump 134 through conduit 144. Under conditions such as extreme cold, oil may not pass initially even through full-flow cartridges 36. In that event, oil pressure in the filter chamber will increase until it exceeds the setting of relief valves 72, whereupon said valves will open and pass oil directly into standpipes 28 and thence through strainers 102 as previously described, without actual filtration. This is not considered objectionable, however, since the strainers will give adequate protection for the short time required for the oil to be heated sufficiently to pass through the paper surfaces of the full-flow cartridges. When this occurs, the filter chamber pressure will drop and relief valves 72 will close. By-pass filters 38 are not provided with relief valves, which results in the fact that unfiltered oil can never enter chamber 24 and conduit 146 which are not protected by strainers.

Assuming now that the full-flow cartridges 36 are passing oil but that the oil is not yet hot enough to flow through the by-pass cartridges, the oil flowing to cartridges 36 will also circulate freely around cartridges 38, since both sets of cartridges are in the same case, and cartridges 38 will be heated thereby. When they have been warmed sufficiently, oil will begin to flow therethrough, and thence through standpipes 30, chamber 24, outlet 26, orifice 94 and conduit 146 to sump 134, where it is again recirculated. It is not practical to return the by-pass oil into the lubricating system pressure line 140, since the relatively great flow resistance of the by-pass units drops the pressure in line 146 below that in line 140. The delay in the start of flow through the by-pass cartridges is not considered objectionable, since the impurities requiring their use accumulate slowly. Furthermore, the system eliminates the necessity of steam jackets, electric heater coils, or other heating means heretofore necessary with by-pass filters to maintain the necessary temperature. Instead, the by-pass elements are heated directly by the flow of warm oil to the full-flow elements.

The proportioning of the oil between the full-flow and by-pass units depends of course on the overall resistance to flow thereof. As previously discussed, by-pass cartridges 38 intrinsically have a greater flow resistance than the full-flow cartridges, so that more oil will tend to pass through the full-flow units. However, the overall proportioning of the oil between the two types of units is not in itself particularly important or critical, and could easily be varied by placing other resistances in the flow paths of the two types of units, or by changing the number of one type of unit as compared to the other. More important is that whatever proportion of the oil flows through the by-pass cartridges, it should be retained therein for a time sufficient to allow absorption of impurities therefrom by the filtering medium. Passage of oil through a depth-type absorption filter at too high a rate will result in poor filtering efficiency. It has been determined that if 5%–10% of the oil passes through the by-pass cartridges with proper retention time therein, the total oil will remain sufficiently pure and free of impurities, without undue increases in space and power requirements. Therefore the problem is to maintain at least a 5%–10% flow in the by-pass cartridges, with adequate retention time. Obviously the size and number of by-pass cartridges must be such as to provide these requirements under poor operating conditions such as low temperature, high viscosity, dirty oil and clogged cartridges, within operating limits. Minimum operating conditions such as these generally do not exist, however, and excessive flow with insufficient retention time in the by-pass cartridges would occur if the by-pass line were not further restricted. The orifice plate 92 provides this restriction. It may of course be interchanged with other plates having different sizes of orifice 94 therein, in order to provide a flow restriction sufficient to provide the retention time required, or an adjustable throttling valve could be used in place of the orifice plate.

As has been pointed out, it may in some circumstances be desirable that the device operate either as an all full-flow or surface type device, or as an all by-pass or absorption type filter, and my device is also made peculiarly adaptable for either of these types of operation by the provision of one or more apertures 148 in conical wall 22, as best shown in FIGS. 1 and 3, whereby to interconnect by-pass outlet chamber 24 with strainer chamber 16. These apertures are closed and sealed by threaded plugs 150 when the device is being used as a combination full-flow and by-pass unit, and when so sealed do not affect the operation as already described.

It will be seen that the full-flow or surface type cartridges 36 and the by-pass or absorption type cartridges 38 are completely interchangeable. Hence when either all-surface or all-absorption type filtration is desired, cover 4 is removed and all of standpipes 28 and 30 are equipped with one type of cartridge or the other. At the same time, plugs 150 are removed, and the usual by-pass outlet pipe 26 is closed, either by inserting an imperforate plate at 92, or by suitable valving means not shown. Access to the plugs may be had through strainer openings 126 of the casing. It will be apparent that then all the oil entering the casing through inlet 14 will be subjected to the same type of filtration, will all reach strainer chamber 16, that oil passing through standpipes 30 being conveyed through chamber 24 and apertures 148, and will then all pass through strainer cartridges 102 and out through the usual full-flow outlet pipe 98. It would of course be possible to close off pipe 98 and thereby direct the entire output to outlet pipe 26. However, pipe 26 would ordinarily not be of sufficient capacity to handle the total output in many installations, and moreover only pipe 98 is interconnected through the strainer units. The stand-by protection of the strainers is of course desirable in most instances to protect against the possibility of rupture or other failure of the filter cartridges. It is also possible, whenever strainer protection is not desired, to remove the strainer cartridges. If the device is to be used as an all-absorption type filter, it may be necessary to provide casing 2 with a suitable auxiliary heater, not shown, to maintain an efficient operating temperature therein.

Outlet pipe 98 is also provided with an orifice plate 152 having an orifice 154 therein. When the device is used as a combination surface and absorption type unit, or when it is used as an all-surface type unit, orifice 154 is usually of the full pipe size so as not to restrict the flow or increase the operating load. When the device is used as an all-absorption type unit, a plate 152 with a smaller restricting orifice is used to insure good retention time of the oil in the cartridges.

Thus it will be seen that a filter device has been produced which can, by means of extremely simple and easily performed modifications, be adapted to serve selectively either as a combination surface and by-pass absorption type filter, or as an all surface-type filter, or as an all absorption type filter, in any case with or without strainer protection. The device is thus rendered extremely versatile and capable of use in a wide variety of applications, either as a self-contained unit providing any of the described types of operation, or as a unit in a larger installation embodying a plurality of the devices.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. A filter device comprising a casing defining a filter chamber having an inlet for liquid to be filtered and a pair of outlets, interchangeable coarse and fine filter cartridges disposed in said filter chamber, said coarse filter cartridges discharging through one of said outlets and said fine filter cartridges discharging through the other of said outlets, said casing forming a pair of outlet chambers interconnected respectively with the two outlets of said filter chamber, said outlet chambers having a common wall with an aperture formed therethrough, means for selectively opening or sealing said aperture, each of said outlet chambers having an outlet, and an adjustable flow restriction disposed in each of said last named outlets.

2. A filter device comprising a casing defining a filter chamber having an inlet for liquid to be filtered and a pair of outlets, interchangeable coarse and fine filter cartridges disposed in said filter chamber, said coarse filter cartridges discharging through one of said outlets and said fine filter cartridges discharging through the other of said outlets, said casing forming a pair of outlet chambers interconnected respectively with the two outlets of said filter chamber, said outlet chambers having a common wall with an aperture formed therethrough, means for selectively opening or sealing said aperture, each of said outlet chambers having an outlet, and a strainer disposed in one of said last named outlets.

3. A filter device as recited in claim 2 with the addition of a pressure relief valve associated with the filter chamber outlet which interconnects directly with the outlet chamber with which said strainer is associated, said relief valve being operable to by-pass liquid around the filter cartridges associated with said last named filter chamber outlet directly to said last named outlet chamber whenever liquid pressure in said filter chamber exceeds a predetermined level.

References Cited in the file of this patent

UNITED STATES PATENTS

| | | |
|---|---|---|
| 1,906,418 | Renfrew et al. | May 2, 1933 |
| 2,098,725 | Hurn | Nov. 9, 1937 |
| 2,253,686 | Burckhalter | Aug. 26, 1941 |
| 2,422,647 | Vokes | June 17, 1947 |
| 2,507,125 | Townsend | May 9, 1950 |
| 2,545,374 | Nugent | Mar. 13, 1951 |
| 2,605,904 | Ogilvie | Aug. 5, 1952 |
| 2,633,245 | Geiser | Mar. 31, 1953 |
| 2,743,018 | Belgarde | Apr. 24, 1956 |
| 2,843,268 | Kennedy | July 15, 1958 |
| 2,979,160 | Haas | Apr. 11, 1961 |

FOREIGN PATENTS

| | | |
|---|---|---|
| 390,889 | Great Britain | Apr. 20, 1933 |